United States Patent [19]

Sutch

[11] 4,078,037

[45] Mar. 7, 1978

[54] PRODUCTION OF COMPOSITE PRODUCTS

[75] Inventor: Brian Leo Chudleigh Sutch, Thames Ditton, England

[73] Assignee: Airfix Industries Limited, Surrey, England

[21] Appl. No.: 749,339

[22] Filed: Dec. 10, 1976

[51] Int. Cl.$^2$ .......................... B29D 9/00; B29G 3/00
[52] U.S. Cl. .................................. 264/266; 264/328; 264/339; 264/342 R
[58] Field of Search ............... 264/261, 263, 328, 259, 264/329, 342 R, 339

[56] References Cited

U.S. PATENT DOCUMENTS 3,154,617  10/1964  Schenk et al. .................. 264/328

*Primary Examiner*—Willard E. Hoag

*Attorney, Agent, or Firm*—Scrivener, Parker, Scrivener and Clarke

[57] ABSTRACT

A method of making a container, particularly a rectangular tray-like container, in which a blank is provided having side panels which are displaced to form the side walls of the container. The blank is clamped in its container - forming shape between mould tools with adjacent ends of the side panels juxtaposed end corner seams and a lip are injection moulded to seam the side panels and form a peripheral lip on the free edges of the side panels remote from the base panel. The mould tools shape the free edges of the side panels to an internally concave form between the juxtaposed side panel ends before moulding so that shrinkage of the moulding will accentuate the concavity to give a predetermined consistent shape to containers so produced and avoid unpredictable buckling and deformity.

2 Claims, 2 Drawing Figures

PRODUCTION OF COMPOSITE PRODUCTS

This invention is concerned with improvements in and relating to composite products, that is products comprising a flexible sheet material, such as card, paper, synthetic plastics or metal, held to a predetermined configuration by an injection moulding which bonds with the sheet material.

In the production of shallow containers or trays, a generally cruciform blank can be used comprising a rectangular base panel and a side panel along each edge of the base panel. The adjacent ends of adjacent side panels are cut to an angle such that they will become juxtaposed as the side panels are hinged relative to the base panel. When the ends are juxtaposed, the side panels will be in the desired attitude relative to the base panel.

If the blank is trapped in a mould cavity which is the shape of the article to be produced and material is injected into seam recesses defined by the tools at which recesses the juxtaposed side panel edges are located and into a peripheral lip recess at which the free edges of the side panels lie, the side panels will be seamed at the corners and a peripheral stiffening or lid receiving lip will be provided. However, upon cooling, the injected material will shrink and since the material is anchored to the sheet material, the shrinkage will result in deformation of the sheet material. This may manifest itself as a haphazard wavey lip which is unacceptable and/or buckling of the side panels.

According to this invention there is provided a method of making an article by forming an injection moulding on a flexible blank, the method comprising shaping the blank by folding marginal portions along their junctions with a main panel to define a receptacle having side walls attached to the base along their length and while clamping the shaped blank between mould tools injecting material into mould cavity means defined by the tools to seam juxtaposed edges of the blank marginal portions and to form on the free edges of the displaced portions remote from the main panel a peripheral lip portion interconnecting the moulded seams, the tools in clamping the blank deforming the displaced marginal portions adjacent the free edges to an internally concave configuration between adjacent seams whereby shrinkage of the moulded lip will accentuate the concavity of the lip and free edges.

In order that the invention may be well understood, there will now be described one embodiment, given by way of example only, reference being had to the accompanying drawing, in which.

Figure 1:
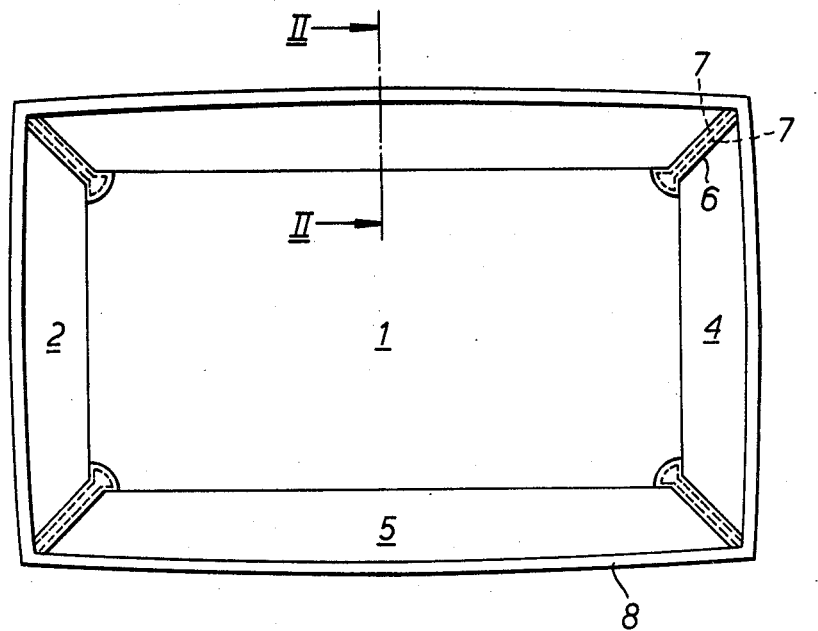
FIG. 1 is a plan view of a shallow container.

The container is made up from a blank including a base panel 1 and four side panels 2, 3, 4, 5. The ends of each side panel are cut so that adjacent edges of adjacent side panels converge toward the main or base panel. Thereby when the side panels are displaced relative to the base panel by being hinged relative to the base panel, the adjacent edges become juxtaposed at a predetermined attitude of the side panels relative to the base panel.

To make the container, the blank is placed in between a core tool and a cavity tool of an injection moulding machine. These tools define a cavity the shape of the final product and at the corners the tools define corner seam recesses and at the lip of the container the tools define a lip recess. The cavity however is shaped so that the free edge of each side panel remote from the base panel and the associated lip will be bowed outwards and each side panel will be bowed outwards in the direction from the edge of the panel adjacent the base to the free edge of the panel.

When material is injected, which may be by way of a pin gate in the cavity tool at the foot of each corner seam recess and in a recess 9 provided in the base panel at each corner, the injected material will flow up the corner seam recess and along the lip recess to form corner seams 6 joining juxtaposed side panel edges 7 and a lip 8. After removal of the completed container from the mould, the injected material will shrink, but because of the bowing of the side panels the resultant distortion is confined to a predetermined amplification of the bowing and not haphazard unpredictable distortion.

Figure 2:
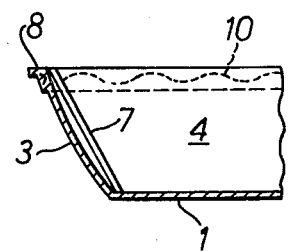
FIG. 2 is a scrap section through the container along the line II—II of FIG. 1.

If desired, to improve the strength of the lip and/or the corner seams, the edges of the blank may be undulated as indicated at 10 in FIG. 2.

So that the side panel free edges lie in a single plane, those free edges may require to be cut with a slight curve to compensate for the bowing of the edges.

What I claim is:

1. A method of making a polygonal container by forming an injection moulding on a flexible blank, the method comprising forming a blank having a polygonal base panel along each edge of which is a fold line by which is secured to the base panel a side panel, folding each side panel relative to the base panel along the fold line to shape the blank to the shape of the container and with the adjacent edges of the side panels juxtaposed, clamping the shaped blank between mould tools, injecting material into mould cavity means defined by the tools to seam the juxtaposed edges of the blank side panels and to form on the free edges of the side panels remote from the base panel a peripheral lip portion interconnecting the moulded seams, the tools in clamping the blank deforming the free edge of each side panel remote from the edge of that panel at the fold line to an internally concave configuration between adjacent seams formed at the juxtaposed edges whereby shrinkage of the moulded lip along any free edge will accentuate the concavity of the lip formed on that edge while the region of the side panel adjacent the base panel remains positioned by the base panel at the fold line.

2. A method according to claim 1 in which the mould tools deform the side panels additionally to an internally concave form in the direction of the depth of the container.

* * * * *